United States Patent
Hayashi et al.

(10) Patent No.: US 7,946,376 B2
(45) Date of Patent: May 24, 2011

(54) ACTUATOR

(75) Inventors: Takeki Hayashi, Aichi-ken (JP); Masashi Aoki, Aicih-ken (JP); Hirokazu Matsuura, Aichi-ken (JP); Hajime Kitte, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 133 days.

(21) Appl. No.: 12/385,224

(22) Filed: Apr. 2, 2009

(65) Prior Publication Data

US 2009/0266638 A1    Oct. 29, 2009

(30) Foreign Application Priority Data

Apr. 28, 2008 (JP) .................................. 2008-117203

(51) Int. Cl.
*B60R 21/34* (2006.01)
*F15B 15/26* (2006.01)

(52) U.S. Cl. ..................................... 180/274; 180/69.21

(58) Field of Classification Search .................. 180/274, 180/69.21, 69.2; 296/193.11; 92/30, 5 L
See application file for complete search history.

(56) References Cited

U.S. PATENT DOCUMENTS

| 2009/0084620 A1* | 4/2009 | Matsuura et al. ............ 180/69.2 |
| 2009/0223360 A1* | 9/2009 | Aoki et al. ........................ 92/15 |
| 2009/0229901 A1* | 9/2009 | Aoki et al. ................. 180/69.21 |

FOREIGN PATENT DOCUMENTS

| JP | A-2000-264146 | 9/2000 |
| JP | A-2003-191818 | 7/2003 |
| JP | A-2004-330912 | 11/2004 |
| JP | A-2008-056068 | 3/2008 |

* cited by examiner

*Primary Examiner* — Faye M. Fleming
*Assistant Examiner* — Keith Frisby
(74) *Attorney, Agent, or Firm* — Posz Law Group, PLC

(57) ABSTRACT

When activated, an actuator causes a piston rod in a cylinder to move forwards so as to support a receiving member for receiving an object to be protected. A lock mechanism for restricting a backward movement of the piston rod includes a lock ring which is accommodated in an accommodating groove on a piston portion and a locking stepped portion on the cylinder side. The locking stepped portion includes a locking and restricting surface and an outer circumferential restricting surface. A taper restricting surface in the accommodating groove on the piston portion is brought into abutment with an inner surface on a forward moving side of the lock ring which is being diametrically expanded as a result of the piston rod having moved forwards and is in abutment with the locking and restricting surface and the outer circumferential restricting surface of the locking stepped portion, whereby the backward movement of the piston rod is restricted by making use of the lock ring which is restricted in the locking stepped portion.

2 Claims, 9 Drawing Sheets

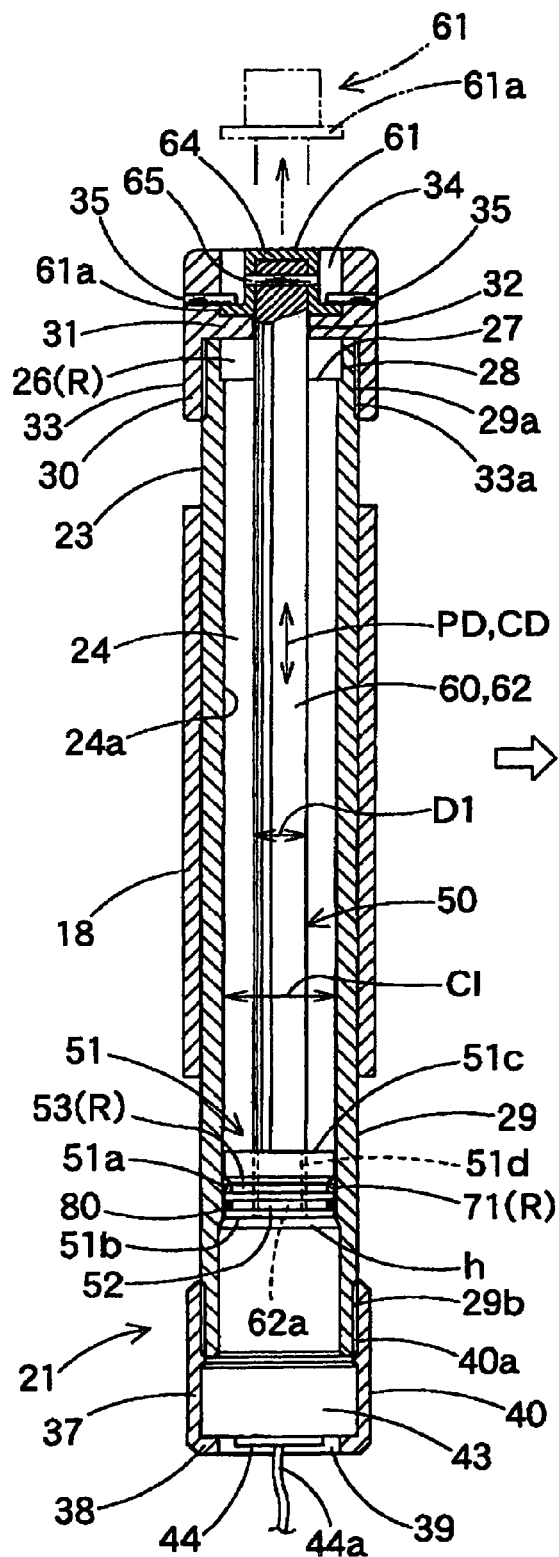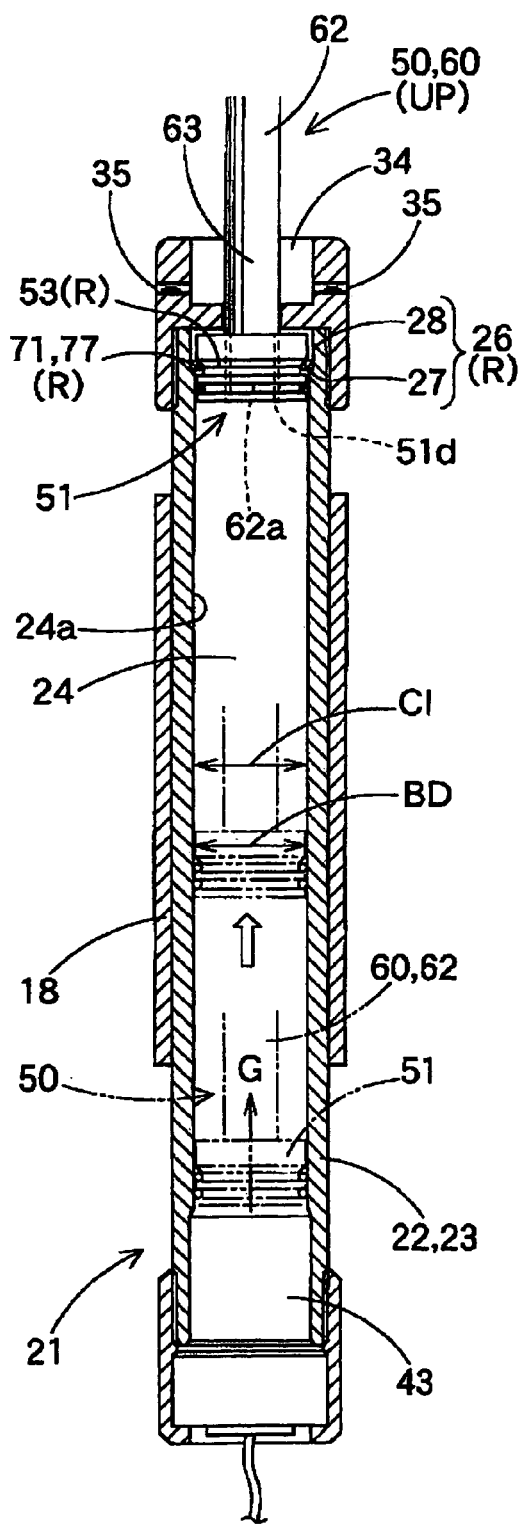

ACTUATOR

BACKGROUND OF THE INVENTION

1. Field of the Invention

The present invention relates to an actuator for use in automotive safety equipment and more particularly to, for example, an actuator for use in an operation such as one for raising a hood panel of an automobile when receiving a pedestrian as an object to be protected by the hood panel.

2. Related Art

Conventionally, as actuators for safety equipment mounted on motor vehicles, there have been actuators for raising a rear end side of a hood panel so as to receive a pedestrian by the hood panel itself by making use of energy absorption taking place when the hood panel is plastically deformed (for example, refer to JP-A-2004-330912).

The actuators were configured as actuators of a piston cylinder type in which gas generated when a gas generator was activated was used as a drive source, so as to be put into operation quickly. In the actuators so configured, gas generated as working fluid when the gas generator was activated was filled within the cylinder so as to raise the piston rod housed in the cylinder, so that the hood panel supported on an upper end side of the piston rod could be raised. In addition, the piston rod was constructed into something like one in which the piston was integrated with a support rod which extended from the piston so as to support the hood panel. Further, in the actuator, a lock mechanism was built therein so as to restrict a descending movement of the piston rod that had once been raised relative to the cylinder so as to prevent the descending movement of the hood panel after the hood panel had once been raised by gas from the gas generator being filled within the cylinder.

This lock mechanism was constructed in such a manner that a C ring which was made of a wire material having a circular cross section and was made to be elastically deformed in a diametrical contracting direction was disposed in an accommodating groove provided on an inner circumferential surface side of the cylinder in a circumferential direction, that an outer circumferential surface side of the piston rod was made to slide on an inner circumferential surface of the cylinder along a substantially full length of the cylinder and that a fitting groove into which the C ring was allowed to fit was disposed on the outer circumferential surface of the piston rod in a position where locking was desired to take place. In this lock mechanism, when the actuator was activated, the piston rod was caused to ascend, and the portion of the piston rod where the locking groove was provided was disposed in the portion of the cylinder where the accommodating groove was provided, whereby the C ring was diametrically contracted so as to enter the fitting groove in such a way as to extend between the accommodating groove on the inner circumferential side of the cylinder and the fitting groove on the piston rod, a descending movement of the piston rod being thereby restricted.

In the conventional actuators, however, the accommodating groove side surface and the fitting groove side surface which confronted each other across the C ring when the lock mechanism was activated were both made into not surfaces which were directed in a direction which was at right angles to the axial direction of the piston rod but the taper surfaces which were parallel to each other in such a manner as to diametrically expand as they extended upwards. Because of this, in the event that the C ring behaved as being diametrically expanded in a radially outward direction of the cylinder between the confronting taper surfaces when locking took place, it became difficult to restrict the diametrical expansion of the C ring due to a lower surface side of the cylinder side accommodating groove being formed in such a manner as to be diametrically expanded in an upward direction, leading to a fear that the C ring was allowed to pop out from the interior of the fitting groove on the piston rod to thereby easily cancel the locked state. Thus, there was room for improvement.

In particular, in the event that the actuator is configured such that the piston rod which projects from the cylinder after the activation of the actuator is made to project from the cylinder and is made to be bent and plastically deformed so as to absorb the kinetic energy of an object to be protected when the receiving member receives the object to be protected, a compression stress is applied to the piston rod along the axial direction thereof, and this compression stress is combined with a bending stress along the direction which is at right angles to the axis of the piston rod so as to be applied to the piston rod. As this occurs, a minute sliding gap exists in the location of the piston rod which slides within the cylinder, and this gap is combined with an action of the piston rod in which the piston rod is inclined in the direction which is at right angles to the axis of the piston rod within the cylinder, whereby with no action taken to cope with this, there tends to be caused a fear that the C ring moves in the way described above when locking takes place, as a result of which the cancellation of the locked state is facilitated further.

Further, in a case where the outside diametrical dimension of the piston rod is changed so as to adjust the bending rigidity of the piston rod in order to adjust the absorption amount of kinetic energy of the object to be protected when the piston rod is bent and plastically deformed, in the conventional actuators, since the construction is adopted in which the outer circumferential surface of the piston rod is made to slide on the inner circumferential surface of the cylinder along the substantially full length of the piston rod with the C ring interposed therebetween, the change is not limited to a change in the piston rod, and the inside diameter of the cylinder also needs to be changed. Thus, the adjustment of kinetic energy absorption amount has not been easy to be dealt with.

SUMMARY OF THE INVENTION

The invention has been made with view to solving the problem inherent in the related art, and an object thereof is to provide an actuator which can restrict a backward movement of a piston rod after the actuator has been activated in a stable manner and can easily deal with a change in bending rigidity of a piston rod which supports a receiving member when it is required.

With a view to achieving the object, according to an aspect of the invention, there is provided an actuator for use in automotive safety equipment configured such that when activated to operate, a piston rod having a piston portion within a cylinder and a support rod portion connected to the piston portion and projecting out of the cylinder is caused to move forwards and comprising a lock mechanism for restricting a backward movement of the piston rod that has moved forwards, the support rod portion projecting from the cylinder being made to support a receiving member for receiving an object to be protected, wherein the support rod portion is disposed so as to be bent and plastically deformed when the receiving member receives the object to be protected after the support rod portion has moved forwards so as to absorb kinetic energy of the object to be protected, wherein the cylinder includes:

a main body portion along which the piston portion which is moving forwards is allowed to slide; and a distal end wall portion disposed on a distal end side which constitutes the receiving member side, allowing the support rod portion to pass therethrough and having an insertion hole which prohibits the insertion of the piston portion, wherein the lock mechanism includes:

an annular lock ring contracted diametrically to be accommodated in an accommodating groove formed on an outer circumferential surface of the piston portion along a circumferential direction while being made to diametrically expand when being restored and made of an elastically deformable wire material having a circular cross section; and a locking stepped portion disposed in the vicinity of the distal end wall portion of the main body portion of the cylinder and in the vicinity of the lock ring positioned after the piston rod has moved forwards and recessed diametrically beyond an inner circumferential surface of the main body portion so as to restrict a backward movement of the lock ring, wherein the locking stepped portion includes:

a locking and restricting surface brought into abutment with a backward moving side portion of the lock ring as a surface which is at right angles to an axial direction of the main body portion when restricting a backward movement of the lock ring; and an outer circumferential restricting surface extending from an outer circumferential edge of the locking and restricting surface to a forward moving side of the piston rod along the axial direction of the main body portion so as to be brought into abutment with an outer circumferential surface of the locking ring which is being diametrically expanded when restricting a backward movement of the lock ring, wherein the locking and restricting surface is disposed in such a manner that a width dimension which extends from the inner circumferential surface of the main body portion to the outer circumferential restricting surface along a direction which is at right angles to an axis of the main body portion is referred to as a dimension by which an inner circumferential side portion of the lock ring is caused to project further towards an axial center of the main body portion than the inner circumferential surface of the main body portion in such a state that the lock ring is expanded diametrically so as to be brought into abutment with the outer circumferential restricting surface, wherein the accommodating groove on the piston portion is formed into a recessed shape which enables the forward movement of the piston rod in such a state that the lock ring is accommodated in the accommodating groove and has a taper restricting surface formed on a side of the piston rod which faces the forward moving side, the taper restricting surface having a taper shape which is expanded radially outwards, and wherein the taper restricting surface is brought into abutment with a forward moving side inner surface of the inner circumferential side portion of the lock ring in such a state that the taper restricting surface is diametrically expanded after the piston rod has moved forwards and that the taper restricting surface is in abutment with the locking and restricting surface and the outer circumferential restricting surface of the locking stepped portion, so as to enable the restriction of a backward movement of the piston rod by making use of the lock ring which is restricted by the locking stepped portion.

In the actuator according to the aspect of the invention, in the event that when the actuator is activated, the piston rod moves forwards and the accommodating groove on the piston portion is disposed in the position on the cylinder where the locking stepped portion is provided, the lock ring accommodated in the accommodating groove enters the locking stepped portion, so as to be diametrically expanded on the locking and restricting surface of the locking stepped portion in such a state that the outer circumferential surface of the lock ring is brought into abutment with the outer circumferential restricting surface of the locking stepped portion and that the inner circumferential surface side portion of the lock ring is made to project further towards the axis center side of the main body portion than the inner circumferential surface of the main body portion. Because of this, even though the piston rod attempts to move backwards after it has moved forwards, the taper restricting surface which has the taper shape expanding radially outwards comes into abutment with the forward moving side inner surface of the inner circumferential side portion of the lock ring which is projecting further towards the axis side of the main body portion than the inner circumferential surface of the main body portion of the cylinder at the side surface side of the accommodating groove, whereby the backward movement of the piston rod is restricted by making use of the lock ring which is restricted by the locking stepped portion.

As this occurs, the lock ring is diametrically expanded in such a way as to be restored from the state in which the lock ring is diametrically contracted to be accommodated in the accommodating groove on the piston portion and comes into abutment with the locking and restricting surface of the locking stepped portion at its backward moving side surface and with the outer circumferential restricting surface of the locking stepped portion at its outer circumferential surface to thereby be fixed to the locking stepped portion in such a way as to be restricted with respect to its backward movement and diametrically expanding movement, and the inner circumferential side portion of the lock ring is projecting further towards the axis center side of the main body portion on the inner circumferential surface side of the main body portion of the cylinder. In other words, in this state, the lock ring is projecting towards the inner circumferential side of the main body portion at the portion on the cylinder where the locking stepped portion is disposed so as to constitute the locking edge for locking the accommodating groove on the piston portion of the cylinder. In addition, since the wire material forming the lock ring has the circular cross section and even though the portion of the wire material in the locking state is twisted in such a manner as to rotate about the vicinity of the center of the circular cross section, the lock ring is not changed in such a manner as to reduce the projecting amount towards the inner circumferential side of the main body portion, the locking edge made up of the lock ring allows the taper restricting surface of the accommodating groove to come into abutment therewith in a stable manner so as to lock the piston portion of the piston rod, thereby making it possible to implement locking so as to restrict the backward movement of the piston rod even though the accommodating groove moves forwards together with the piston portion to interfere with the locking edge again.

Further, in the actuator according to the invention, when the backward movement of the piston rod is restricted and the receiving member receives an object to be protected, the support rod portion of the piston rod which projects from the cylinder is bent and plastically deformed so as to absorb the kinetic energy of the object to be protected.

In addition, in the actuator according to the invention, even though the outside diametrical dimension of the support rod portion is changed so as to change the bending rigidity thereof, although the inside diametrical dimension of the insertion hole for the support rod portion in the distal end wall portion on the cylinder side needs to be adjusted, the configurations of the piston portion including the accommodating groove, the lock ring and the cylinder side locking stepped portion do not have to be changed but can continue to be used, the attempt to change the bending rigidity of the support rod portion or the piston rod being thereby dealt with easily.

Consequently, with the actuator according to the invention, the backward movement of the piston rod after it has moved forwards can be restricted in a stable manner, and the attempt to change the bending rigidity of the piston rod which supports the receiving member can easily be dealt with.

In addition, in the actuator according to the invention, the lock ring is made of the wire material having a circular cross section. Thus, even though the lock ring accommodated in the accommodating groove slides over the inner circumferential surface of the main body portion of the cylinder when the actuator is activated, only the wire-like thin portion extending in the outer circumferential surface of the lock ring in the circumferential direction is brought into line contact with the inner circumferential surface of the main body portion, whereby the piston rod can move forwards within the cylinder in a smooth manner with suppressed frictional resistance.

In addition, the locking and restricting surface of the locking stepped portion is desirably disposed in such a manner that a width dimension which extends from the inner circumferential surface of the main body portion to the outer circumferential restricting surface along a direction which is at right angles to an axis of the main body portion is made to be equal to or larger than a radius dimension of the wire material which forms the lock ring. Of course, an upper limit of the width dimension of the locking and restricting surface in this case is a dimension which is less than the diameter of the wire material making up the lock ring and which allows the inner circumferential side portion of the lock ring which is being diametrically expanded to thereby be brought into abutment with the outer circumferential restricting surface on the outer circumferential surface thereof to project further towards the axis side of the main body portion than the inner circumferential surface of the main body portion.

In the configuration described above, in the event that when the actuator is activated to operate, the piston rod moves forwards and the lock ring expands diametrically to thereby enter the locking stepped portion from the accommodating groove, the outer circumferential surface of the lock ring is brought into abutment with the outer circumferential restricting surface of the locking stepped portion, and the backward moving side surface of the lock ring is brought into abutment with the locking and restricting surface of the locking stepped portion in such a manner as to restrict the backward movement of the lock ring. Then, as this occurs, the portion of the backward moving side surface of the lock ring which is brought into abutment with the locking and restricting surface of the locking stepped portion can ensure the state in which a backward moving side apex portion is in abutment with the area of the locking and restricting surface itself which lies in the vicinity of the inner circumferential surface side edge of the main body portion. Namely, the backward moving side apex portion of the wire material having a circular cross section and making up the lock ring is brought into abutment with the locking and restricting surface which confronts the backward moving direction at right angles to thereby restrict the backward movement of the lock ring. Therefore, even though the compression stress applied to the piston rod is high, the locking and restricting surface of the locking stepped portion can receive the piston rod with the lock ring interposed therebetween. Further, in the event that the diametrically expanded lock ring is brought into abutment with the outer circumferential restricting surface of the locking stepped portion on the outer circumferential surface thereof, the center of the cross section of the wire material which makes up the lock ring comes to be disposed in the area of the locking and restricting surface from the inner circumferential surface of the main body portion along the direction which is at right angles to the axis of the main body portion. Due to this, even though the lock ring interferes with the taper restricting surface and attempts to return to the accommodating position in the accommodating groove (the initial accommodating position before the activation of the actuator), on the backward moving side to which the lock ring attempts to move, the locking and restricting surface lies squared against the lock ring with the backward moving side apex portion of the wire material having a circular cross section and making up the lock ring kept stationary to restrict the backward movement of the lock ring. Therefore, the behavior of the lock ring attempting to be restored to the accommodating position in the accommodating groove is prevented in an ensured manner.

BRIEF DESCRIPTION OF THE DRAWINGS

FIGS. 5A and 5B are schematic vertical sectional views of the actuator of the embodiment showing the actuator before activation and after completion of activation thereof.

DETAILED DESCRIPTION OF THE PREFERRED EMBODIMENTS

Figure 1:
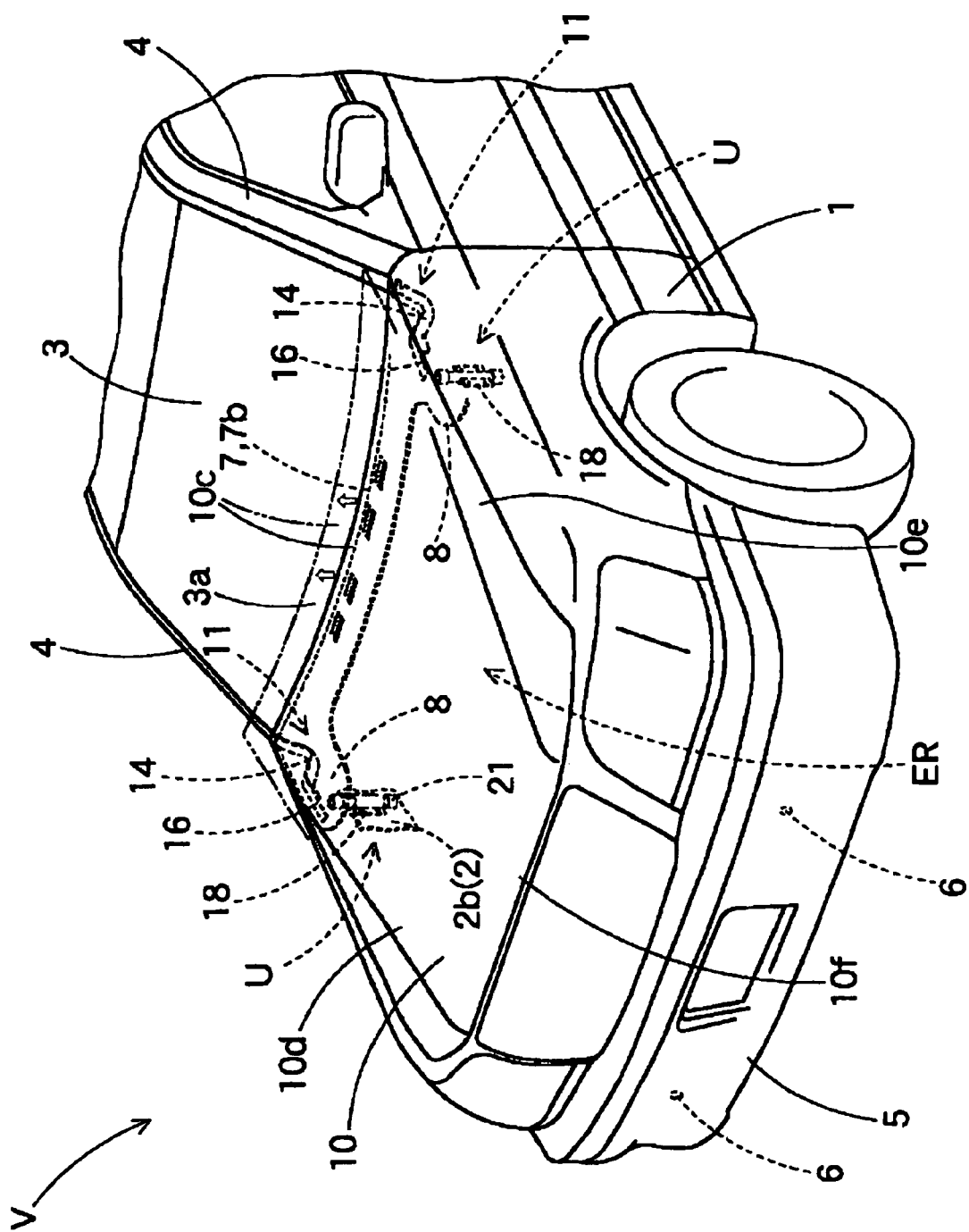
FIG. 1 is a perspective view of a vehicle on which a lift-up apparatus (a hood lift-up apparatus) is equipped in which an actuator according to an embodiment of the invention is applied.
Figure 2:
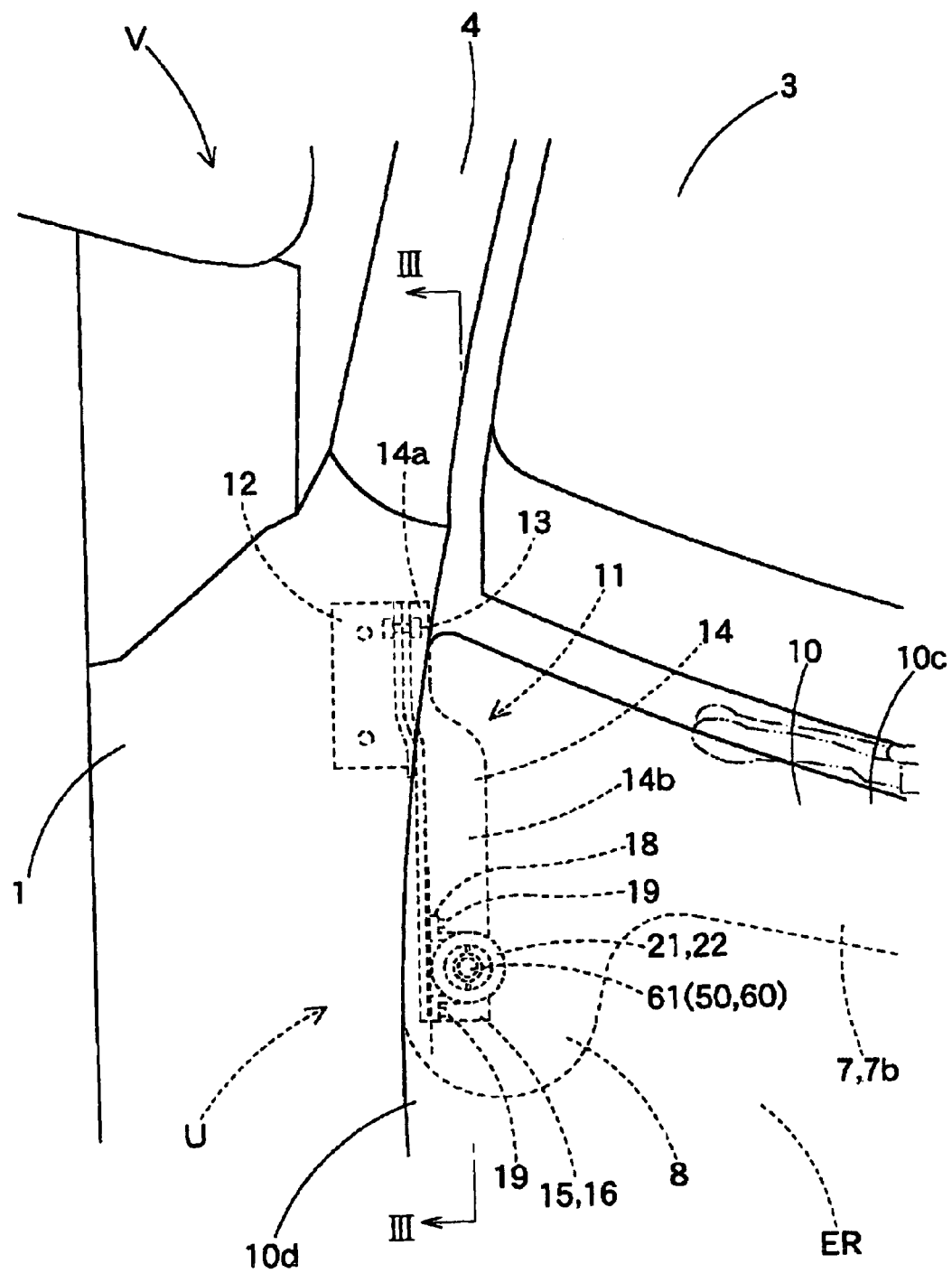
FIG. 2 is a partial enlarged plan view of the vehicle on which a lift-up apparatus of the embodiment is equipped.
Figure 3:
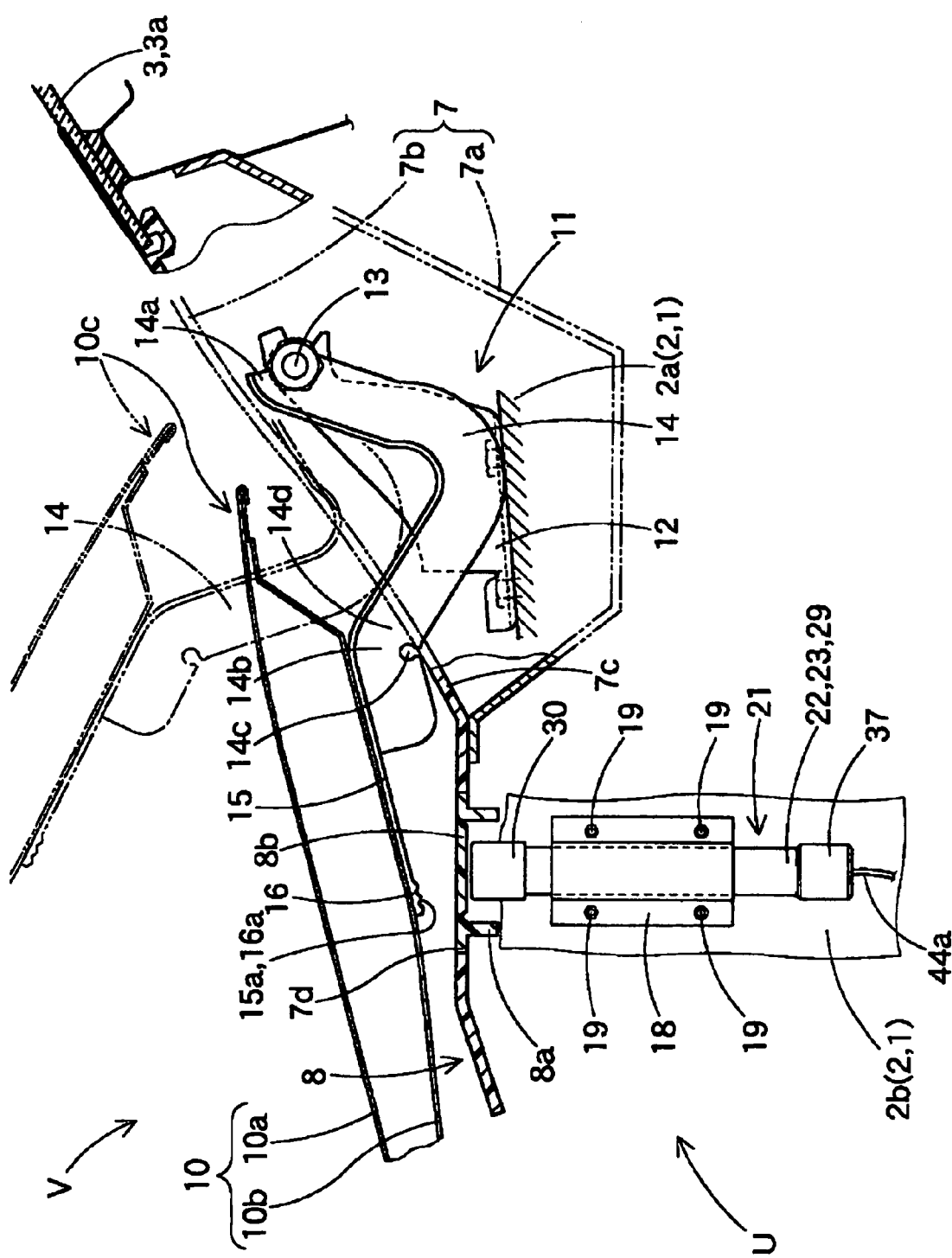
FIG. 3 is a schematic longitudinal vertical sectional view showing the lift-up apparatus of the embodiment and a hinge portion of the vehicle, which corresponds to a portion indicated by the line III-III in FIG. 2.
Figure 4:
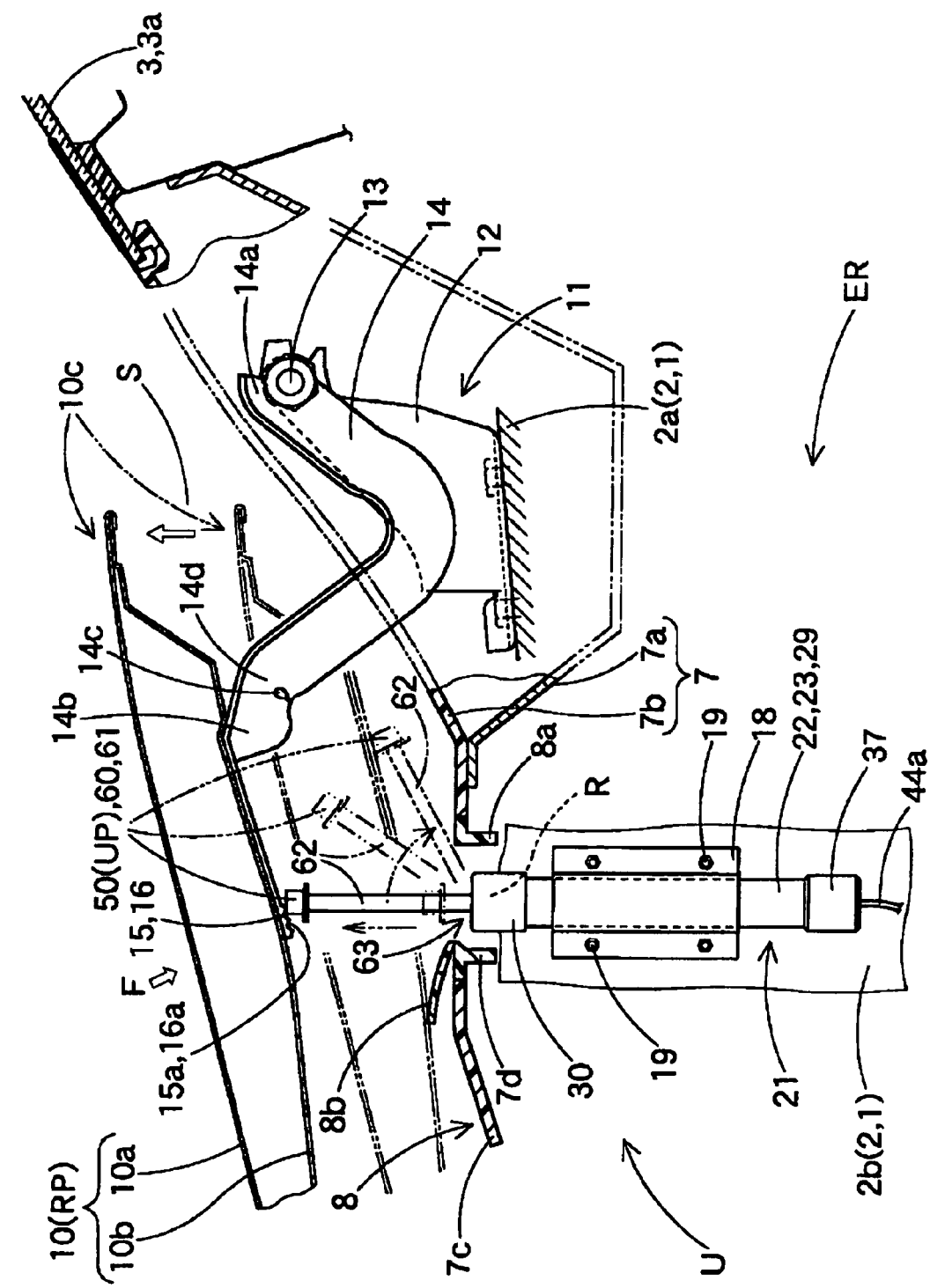
FIG. 4 is a schematic vertical sectional view showing a state in which the lift-up apparatus of the embodiment is activated.
Figure 6A:
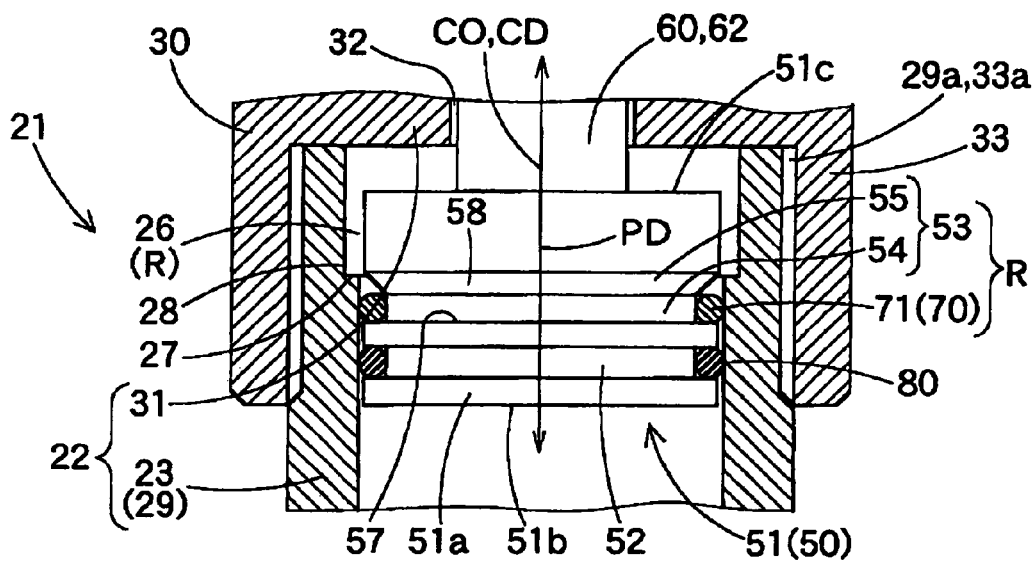
FIGS. 6A to 6C are enlarged schematic partial vertical sectional views showing states of a piston portion to illustrate sequentially the operation of a lock mechanism in the actuator of the embodiment.
Figure 6B:
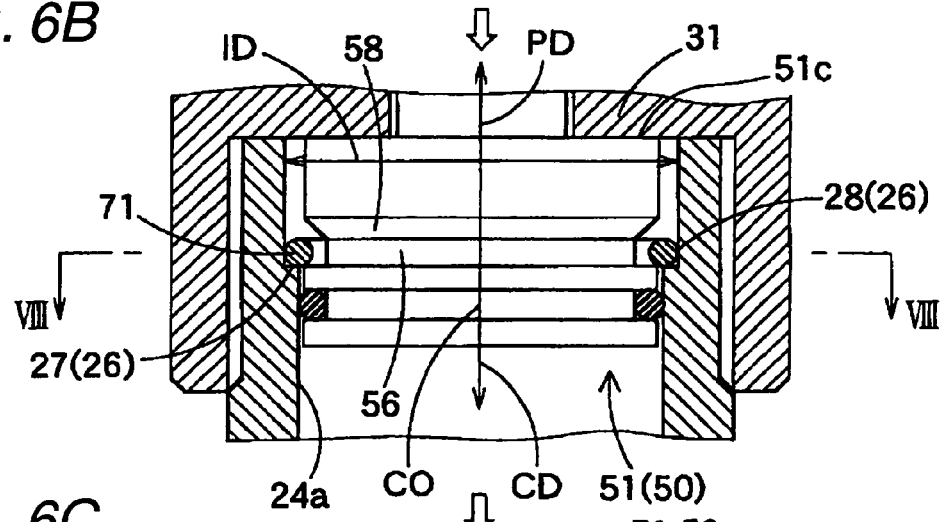
Figure 6C:
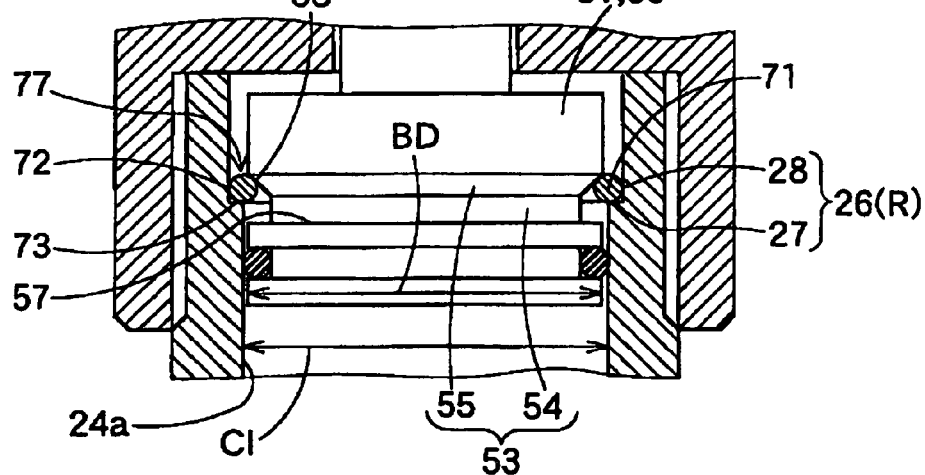

Hereinafter, an embodiment of the invention will be described based on accompanying drawings. Automotive safety equipment to which an actuator 2 of this embodiment is applied is a hood lift-up apparatus (hereinafter, referred to simply as a "lift-up apparatus") U. This lift-up apparatus U is, as is shown in FIGS. 1, 2, such as to be disposed in positions lying near a left-hand edge 10*d* and a right-hand edge 10*e* on a rear end 10*c* side of a hood panel 10 of a vehicle V, respectively. Each lift-up apparatus U includes an actuator 21 and a receiving seat 16 which is disposed on a lower surface of the hood panel 10 at the rear end 10*c*. In addition, as is shown in FIGS. 3, 4, in the lift-up apparatus U, when it is activated, the actuator 21 raises a piston rod 50 to thereby raise the rear end 10*c* of the hood panel 10 in a lift-up manner via the receiving seat 16.

In addition, when used in this specification, unless described otherwise, front-rear or longitudinal and up-down or vertical directions are understood as coinciding, respectively, with longitudinal and vertical directions of the vehicle V1 (refer to FIG. 1), and directions denoted by left and right are understood as coinciding, respectively, with the left and right of the vehicle V when the vehicle V is seen from the front towards the rear thereof.

Additionally, in the case of this embodiment, as is shown in FIG. 1, sensors 6 capable of detecting or predicting a collision with a pedestrian are provided in a front bumper 5 of the vehicle 1, and signals from the sensors 6 are inputted into an activation circuit, not shown. When detecting or predicting a collision of the vehicle V with a pedestrian based on signals from the sensors 6, the activation circuit is configured to activate a gas generator 43 (refer to FIGS. 5A and 5B), which functions as a drive source in the actuator 21 of the lift-up apparatus U.

Further, as is shown in FIGS. 1, 2, the hood panel 10 is such as to be provided to cover an engine room ER of the vehicle V from thereabove and is connected to a body 1 of the vehicle V by hinge portions 11 which are disposed, respectively, on the left-hand and right-hand edges in positions lying in the vicinity of the rear end 10*c* in such a manner as to be opened and closed at a front end thereof. The hood panel 10 is made of a sheet metal made of aluminum (aluminum alloy) and includes, as is shown in FIG. 3, an outer panel 10*a* which lies on an upper surface side and an inner panel 10*b* which lies on a lower surface side of the hood panel 10 and whose strength is increased more than that of the outer panel 10*a*. The hood panel 10 is configured in such a manner as to be plastically deformed so as to absorb the kinetic energy of a pedestrian when the hood panel 10 receives the pedestrian. In addition, in this embodiment, when a pedestrian collides with the vehicle V, the actuator 21 is activated, and as is shown in FIG. 4, a deformation space S can be defined between the rear end 10*c* of the hood panel 10 which is now raised by the actuator 21 and the engine room ER, thereby making it possible to increase the plastic deformation amount when a bending plastic deformation takes place.

The hinge portions 11 are provided, respectively, on the left-hand edge 10*d* and the right-hand edge 10*e* in the positions lying on the rear end 10*c* side of the hood panel 10 (refer to FIG. 1) and each includes a hinge base 12 which is fixed to a mounting bracket 2*a* connected to a hood ridge reinforcement 2 on the body 1 side and a hinge arm 14 which is fixed to the hood panel 10 side (refer to FIGS. 2, 3). As is shown in FIG. 3, each hinge arm 14 is configured to have a substantially semi-arcuate shape by curving an angle material made of a sheet metal in such a manner as to project downwardly or be concave upwardly. The hinge arm 14 is connected rotatably to the hinge base 12 at a hinge base 12 side proximal end 14*a* thereof by making use of a support shaft 13. In addition, each hinge arm 14 includes a connecting plate portion 15 which extends in such a manner as to substantially follow a longitudinal direction from a distal end 14*b* on a distal end 14*b* side which is spaced away from the proximal end 14*a*, and this connecting plate portion 15 is connected to the lower surface of the hood panel 10 at the rear end 10*c* by making use of welding or the like.

In addition, in the case of this embodiment, in this connecting plate portion 15, a lower surface of a front portion is made to constitute an abutment location 15*a* with which a distal end (an upper end) 50*a* of a piston rod 50 (a head portion 61 of support rod portion 60) is brought into abutment when the piston rod 50 is raised. Namely, the front portion side of the connecting plate portion 15 constitutes the receiving seat 16 which receives the upper end 50*a* of the piston rod 50, and a lower surface of the receiving seat 16 constitutes a receiving surface 16*a* which receives the upper end 50*a* (refer to FIGS. 3, 4).

Each support shaft 13 is disposed in such a manner that its axial direction extends along a transverse direction of the vehicle V. In addition, when opening the hood panel 10, a front end 10*f* side of the hood panel 10 (refer to FIG. 1) is raised about the left and right support shafts 13 as rotating centers together with the distal end 14*b* sides of the respective hinge arms 14 so that the hood panel 10 is opened from the front as from a position indicated by solid lines to a position indicated by chain double-dashed lines in FIG. 3, whereby the hood panel 10 can be opened from the front thereof.

In addition, a cut-out recessed portion 14*c* is formed in the hinge arm 14 in the vicinity of the distal end 14*b* thereof in such a manner as to cut out a lower edge into a substantially circular shape. When the actuator 21 is activated and the piston rod 50 pushes up the rear end 10*c* of the hood panel 10, a portion lying around a circumference of the cut-out recessed portion 14*c* functions as a plastically deformable portion 14*d* which is plastically deformed which enables the rising of the rear end 10*c* of the hood panel 10 (refer to FIG. 4). In addition, a latch mechanism is provided on the front end 10*c* side of the hood panel for normally closing the hood panel 10, and this lock mechanism locks a hood lock striker, not shown, which is disposed at the front end 10*f* of the hood panel 10. Thus, even when the rear end 10*c* of the hood panel 10 is raised, the front end 10*f* of the hood panel 10 is kept engaged with the body 1 side by the latch mechanism which locks the hood lock striker, not shown.

Further, as is shown in FIGS. 2, 3, a cowl 7 is disposed to the rear of the hood panel 10, and the cowl 7 includes a cowl panel 7*a* which lies on the body 1 side and has high rigidity and a cowl bar 7*b* lying above the cowl panel 7*a* and made of a synthetic resin. The cowl bar 7*b* is provided in such a manner as to continue to a lower portion 3*a* of a windshield 3 on a rear end side thereof. As is shown in FIG. 1, 2, front pillars 4, 4 are provided on left and right sides of the windshield 3.

In addition, in the case of the embodiment, the cowl bar 7*b* includes actuator covers 8 which cover the actuators 21 from thereabove and the actuator covers 8 are molded integrally with other general portions of the cowl bar 7. The actuator covers 24 are disposed above the left and right actuators 21, respectively and include door portions 8*b* which are provided in areas surrounded by cylindrical sleeve portions 8*a* and are adapted to be push opened by head portions 61 of the support rod portions 60 of the actuators 21 when the actuators 21 are activated. The cowl bar 7*b* is molded with portions having different pliabilities provided therein and includes hard portions 7*c* and soft portions 7*d* which are more pliable than the hard portions 7*c*. The soft portions 7*d* constitute portions lying in the vicinity of the sleeve portions 8*a* including the door portions 8*b* in the actuator covers 8.

As is shown in FIG. 3, the actuators 21 of the embodiment are held by mounting brackets 18 which each have a U-shaped cross section and which are fastened to mounting flanges 2b connected to the hood ridge reinforcements 2 with bolts 19 and are disposed below the respective hinge portions 11 which lie respectively below the positions on the hood panel 10 which lie on the left- and right-hand edges at the rear end 10c thereof. In addition, as is shown in FIGS. 5A and 5B, each actuator 21 includes a cylinder 22, which is disposed and fixedly attached in such a manner that its axial direction extends in a vertical direction, the gas generator 43 for causing a gas functioning as an operating fluid to flow into the cylinder 22, the piston rod 50 which is disposed so as to project upwards from the cylinder 22, and a lock mechanism R for preventing a backward movement (a descending movement) of the piston rod 50 after it has moved forwards (after it has moved upwards or ascended).

The lock mechanism R includes a lock ring 71, an accommodating groove 53 provided on a piston portion 51 of the piston rod 50 for accommodating the lock ring 71 and a locking stepped portion 26 provided on an inner circumferential surface 24a of the cylinder 22 for allowing part of the lock ring 71 to enter to lock it.

As is shown in FIGS. 5A and 5B, the cylinder 22 includes a cylindrical main body portion 23 between a distal end wall portion 31 on an upper end side and a proximal end wall portion 38 on a lower end side thereof, and the piston portion 51 of the piston rod 50 slides in this main body portion 23. In addition, the cylinder 22 is made up of a steel pipe member 29 which makes up the main body portion 23 and caps 30, 37 which are connected, respectively, to top and bottom of the steel pipe member 29. The distal end wall portion 31 is disposed in the cap 30 which is screwed on an external thread 29a provided on an outer circumferential surface of an upper end portion of the pipe member 29 for connection thereto, while the proximal end wall portion 38 is disposed in the cap 37 which is screwed in an internal thread 29b provided on an outer circumferential surface of a lower end portion of the pipe member 29 for connection thereto.

The main body portion 23 has a sliding hole 24 which has a circular opening which corresponds to an external shape of the piston portion 51 and which is opened throughout the main body portion 23 itself in a vertical direction, whereby when the actuator 21 is activated to operate, the piston portion 51 is allowed to slide over an internal circumferential surface 24a of the sliding hole 24 to ascend (move forwards).

In addition, in the cylinder 22, a locking stepped portion 26 is formed in the vicinity of the distal end wall portion 31 in the main body portion 23 in such a manner as to be recessed further radially outwards than the inner circumferential surface 24a of the main body portion 23 over which the piston portion 51 slides. This locking stepped portion 26 is such as to make up the lock mechanism R and constitutes a portion which is disposed to lie in the vicinity of the lock ring 71, which will be described later, after the piston rod 50 has ascended (moved forwards) so as to restrict a backward movement (a descending movement) of the lock ring 71. The locking stepped portion 26 includes a locking and restricting surface 27 and an outer circumferential restricting surface 28.

As is shown in FIGS. 6A to 8, the locking and restricting surface 27 constitutes a surface which is at right angles to an axial direction CD of the main body portion 23 and is disposed so as to be brought into abutment with a portion 73 of the lock ring 71 which lies on a backward moving side thereof (a surface on a backward side, a backward side surface) when the descending (the backward movement) of the lock ring 71 is restricted. The outer circumferential restricting surface 28 extends from an outer circumferential edge of the locking and restricting surface 27 along the axial direction CD of the main body portion 23 towards a forward moving side (upwards) of the piston rod 50 and is disposed so as to be brought into abutment with an outer circumferential surface 72 of the lock ring 71 which is being diametrically expanded when the lock ring 71 is restricted from backward movement.

Figure 7A:
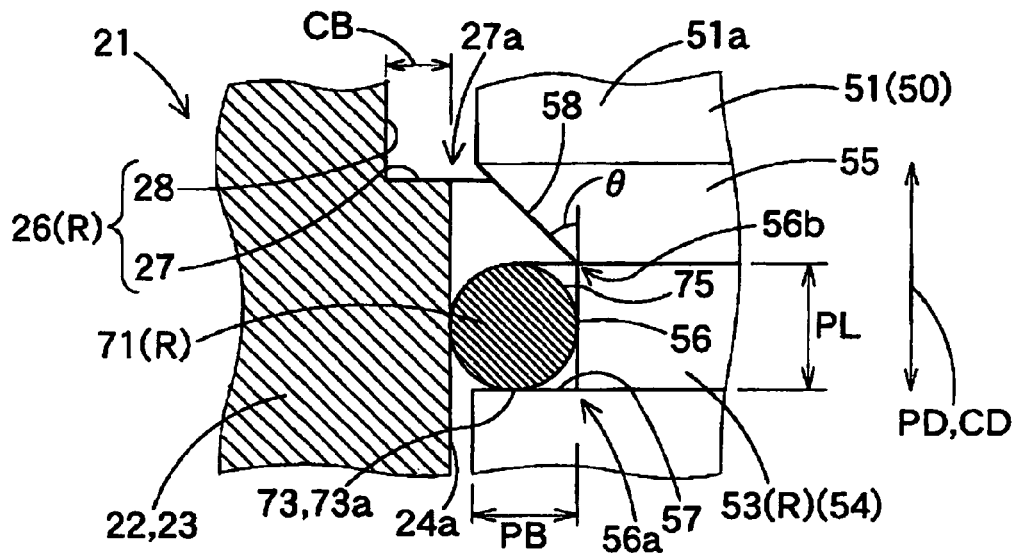
FIGS. 7A to 7C are enlarged schematic partial vertical sectional views depicting states sequentially in which a lock ring of the lock mechanism is locked into a locking stepped portion in the actuator of the embodiment.
Figure 7B:
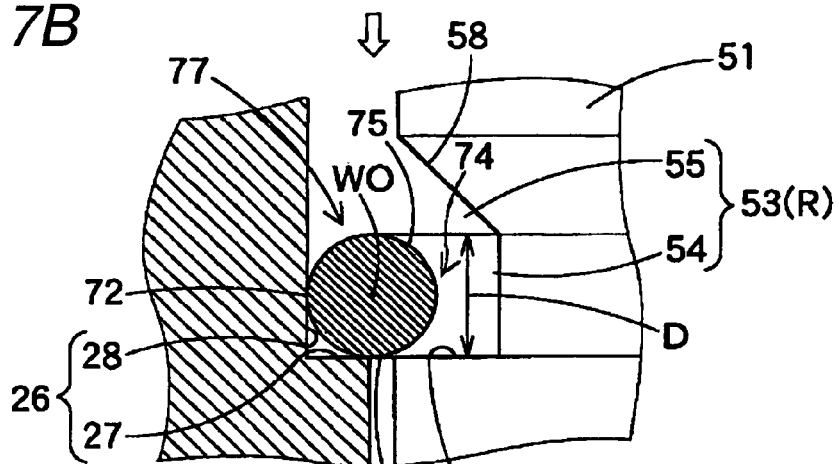
Figure 7C:
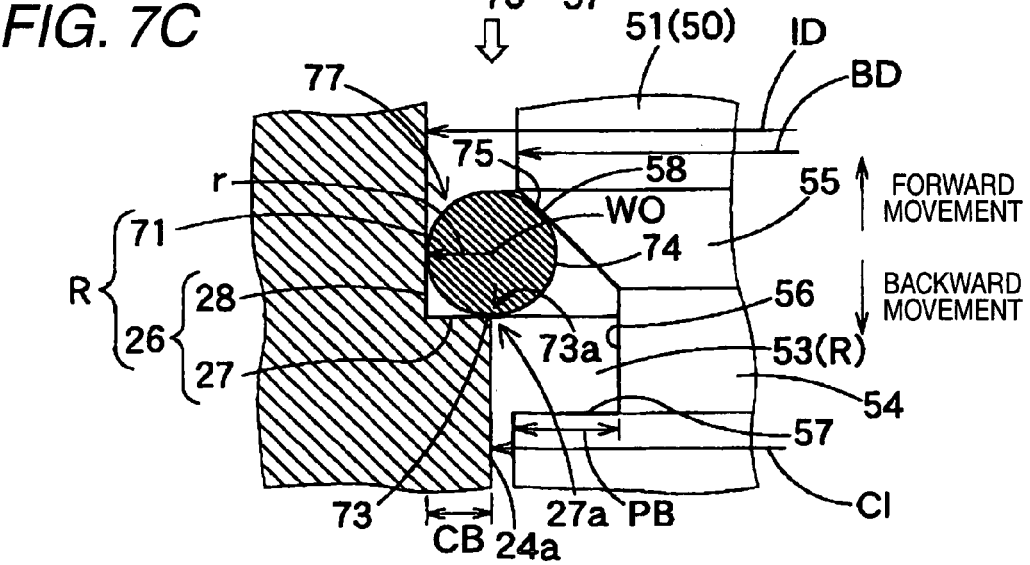

In addition, as is shown in FIGS. 7A to 7C, the locking and restricting surface 27 is provided in such a manner that a width dimension CB which extends along a direction at right angles to the axis of the main body portion 23 from the inner circumferential surface 24a of the main body portion 23 to the outer circumferential restricting surface 28 constitutes a dimension which causes an inner circumferential side portion 74 of the lock ring 71 which is being diametrically expanded to thereby be brought into abutment with the outer circumferential restricting surface 28 on the outer circumferential surface 72 thereof to project further towards an axis center side of the main body portion 23 than the inner circumferential surface 24 of the main body portion 23. Further, the width dimension CB of the locking and restricting surface 27 is made to be equal to or larger than a radius dimension r of a wire material 70 which makes up the lock ring 71, and in the case of this embodiment, the width dimension CB is made to be equal to the radius dimension r of the wire material 70.

As is shown in FIGS. 5A and 5B, the cap 30 which is disposed on the upper end side of the main body portion 23 of the cylinder 22 is configured to include the distal end wall portion 31 which closes an upper end of the cylinder 22. The cap 30 includes a sleeve portion 33 which extends vertically from an outer circumferential edge of the distal end wall portion 31 into a substantially cylindrical shape, and an internal thread 33a is formed on an inner circumferential surface of a portion of the sleeve portion 33 which lies lower than the distal end wall portion 31 in such a manner as to screw on the external thread 29a provided on the pipe member 29. An insertion hole 32 is provided in a center of the distal end wall portion 31, and this insertion hole 32 allows the insertion of the support rod portion 60 of the piston rod 50 but does not allow the insertion of the piston portion 51 of the piston rod 50. In addition, a portion of the sleeve portion 33 which lies upper than the distal end wall portion 31 is made to constitute an accommodating recessed portion 34 which accommodates the cylindrical head portion 61 of the support rod portion 60 before the activation of the actuator 21 is implemented. A shear pin 35 for locking a collar portion 61a of the head portion 61 is provided in the sleeve portion 33 at the accommodating recessed portion 34. The shear pin 35 functions to keep the head portion 61 accommodated without any looseness in the accommodating recessed portion 34 before the actuator 21 is activated and is made to be sheared when the piston rod ascends. In addition, in the piston rod 50, the head portion 61 is fixed to an upper surface side of the distal end wall portion 31 by making use of the shear pin 35 and a bottom surface 51b of the piston portion 51 is disposed above a gas generator 43 with a gap h provided therebetween.

As is shown in FIGS. 5A and 5B, the cap 37 disposed on the lower end side of the main body portion 23 includes the substantially cylindrical proximal end wall portion 38 which is disposed so as to close the lower end side of the main body portion 23 and a substantially cylindrical circumferential wall portion 40 which extends upwards from an outer circumferential edge of the proximal end wall portion 38. An insertion hole 39 is formed in the proximal end wall portion 38 in such a manner as to allow the insertion of a connector 44 for the gas generator 43. An internal thread 40a is provided on an inner circumferential surface on an upper end side of the circumferential wall portion 40 in such a manner as to screw on the external thread 29b which is provided on the outer circumferential side of the lower end of the pipe member 29 of the cylinder 22. The cap 37 is attached to the main body portion 23 by screwing the internal thread 40a on the external thread 29b in such a state that the gas generator 43 is attached to the proximal end wall portion 38 by making use of a portion of the proximal end wall portion 38 which surrounds a circumferential edge of the insertion hole 39 and a lower portion of the circumferential wall portion 40.

The gas generator 43 adopts a micro gas generator, and the connector 44 is disposed on a lower end face of the gas generator 43 (refer to FIGS. 5A and 5B), and a lead wire 44a is connected to the connector 44 so that electric signals are inputted from a control circuit, not shown. When an electric signal is inputted into the gas generator 43 through the lead wire 44a from the control circuit, not shown, gunpowder incorporated in the gas generator 43 is ignited to generate combustion gas, and the operating gas (combustion gas) G is then supplied to a bottom surface (a lower surface) 51b side of the piston portion 51 within the cylinder 2 as an operating fluid.

As is shown in FIGS. 5A and 5B, the piston rod 50 includes the piston portion 51 which is disposed within the cylinder 22 and the support rod portion 60 which extends upwards from the piston portion 51. The piston portion 51 is formed into a substantially cylindrical body which can slide relative to the inner circumferential surface 24a of the sliding hole 24 in the main body portion 23 of the cylinder 22 with the lock ring 71 and an O ring 80 interposed therebetween. A fitting groove 52 is formed on an outer circumferential surface 51c of the piston portion 51 in a position lying in the vicinity of the bottom surface side 51b thereof for the O ring 80 to be fitted therein, and an accommodating groove 53 is formed in a position lying in the vicinity of a ceiling surface 51c side of the piston portion 51 for the lock ring 71 to be fitted therein. In addition, a threaded hole 51d is formed on a ceiling surface 51c of the piston portion 51 as a connecting portion with which a support rod portion 60A (refer to FIG. 9) having a different bending rigidity is connected to replace the support rod portion 60. An external thread portion 62a is screwed into the threaded hole 51d as a connecting portion of the support rods 60, 60A, whereby the support rod portions 60, 60A are connected to the piston portion 51.

The accommodating groove 53 is such as to make up the lock mechanism R and is formed into a recessed shape which enables the forward movement (ascending movement) of the piston rod 50 in such a state that the lock ring 71 is accommodated in the accommodating groove 53. As is shown in FIGS. 6A to 7C, the accommodating groove 53 includes an inner circumferential surface (a bottom surface) 56 which extends in the axial direction PD of the piston rod 50, a backward side surface (a surface on a backward side) 57 which extends at right angles to the axial direction PD of the piston rod 50 from a lower edge 56a of the inner circumferential surface 56 as a surface of the piston rod 50 which lies on a backward moving side thereof (a side surface on the backward moving side), and a taper restricting surface 58 having a taper shape which expands radially outwards from an upper edge 56b of the inner circumferential surface 56 towards a forward moving side as a surface on the forward moving side of the piston rod 50. As viewed from an interior space side, this accommodating groove 53 is made up of an angular groove portion 54 on the bottom surface 51b side and a taper groove portion 55 on the ceiling surface 51c side of the piston portion 51. The angular groove portion 54 constitutes an area which is defined by the inner circumferential surface 56 and the backward side surface 57 and is formed to have an opening of a substantially square shape so that the wire material 70, which is made of a spring steel and which makes up the lock ring 71, can be accommodated therein.

In addition, in the case of the embodiment, an outside diametrical dimension BD of the outer circumferential surface 51a of the piston portion 51 which excludes the lock ring 71 and the O ring 80 is 12.6 mm, which is slightly smaller than an inside diametrical dimension C1 (13 mm in the embodiment) of the inner circumferential surface 24a of the main body portion 23 of the cylinder 22.

In addition, a width dimension PB of the backward side surface 57 which is at right angles to the axial direction PD of the piston rod 50 is a dimension which is smaller than a diametrical dimension D of the wire material 70 which makes up the lock ring 71. In the case of this embodiment, the width dimension PB is 0.8 mm. Incidentally, in the case of the embodiment, the diametrical dimension D of the wire material 70 is 1 mm.

Further, a length dimension P1 of the inner circumferential wall 56 measured along the axial direction PD is set to be equal to the diametrical dimension D of the wire material 70. Furthermore, in the case of the embodiment, a taper angle (refer to FIG. 7A) of the taper restricting surface 58 relative to the axial direction of the piston rod 50 is 45°.

In addition, the taper restricting surface 58 is disposed so as to be brought into abutment with a forward moving side inner surface 75 of the inner circumferential side portion 74 of the lock ring 71 which is being expanded diametrically as a result of the forward movement of the piston rod 50 and is in abutment with the locking and restricting surface 27 and the outer circumferential restricting surface 28 of the locking stepped portion 26. The configuration in which the taper restricting surface 58 is allowed to be in abutment with the inner surface 75 of the lock ring 71 is set by adjusting the width dimension CB of the locking and restricting surface 27 of the locking stepped portion 26 of the cylinder 22, the outside diametrical dimension BD of the piston portion 51 and the depth dimension of the accommodating groove 53 (the width dimension of the backward side surface 57).

In addition, the position where the accommodating groove 53 is disposed is set in such a manner that the backward side surface 57 coincides with the locking and restricting surface 27 of the locking stepped portion 26 or is disposed closer to the forward moving side of the piston rod 50 than the locking and restricting surface 27 in the direction following the axial direction CD of the cylinder 22 so that when the piston rod 50 ascends as the actuator 21 is activated and the ceiling surface 51c of the piston portion 51 strikes the distal end wall portion 31 of the cylinder 22 to thereby restrict the forward movement of the piston rod, the lock ring 71 which is accommodated in the accommodating groove 53 can be diametrically expanded so as to enter the locking stepped portion 26. Incidentally, in the case of the embodiment, the position where the accommodating groove 53 is disposed is set in such a manner that the backward side surface 57 coincides with the locking and restricting surface 27 of the locking stepped portion 26 in the direction following the axial direction CD of the cylinder 22 when the forward movement of the piston portion 51 is restricted.

As is shown in FIGS. 5A and 5B, the support rod portion 60 includes a round rod-like shaft portion 62 which is disposed so as to extend along the axial direction (the vertical direction) of the cylinder 22 and the cylindrical head portion 61 which is disposed on an upper end side of the shaft portion 62 and which has an outside diametrical dimension which is larger than that of the shaft portion 62. When the piston rod 50 moves to ascend, the head portion 61 comes into abutment with the receiving surface 16a of the receiving seat 16 provided on the hood panel 10 side to thereby push up the rear end 10c of the hood panel 10. The head portion 61 is made by fastening a cap 64 to an upper end of the shaft portion 62 by fitting a fitting pin 65 thereinto. As has been described before, the head portion 61 is fastened in place within the accommodating recessed portion 34 at the upper end of the cylinder 22 by making use of the shear pin 35.

In addition, the support rod portion 60 is made of a metallic material such as steel so as to be bent and plastically deformed in a location of the shaft portion 62 which projects from the distal end wall portion 31 to lie in the vicinity of the through hole 32 as a flexing point when the support rod portion 60 ascends (moves forwards) to a position where the rear end 10c of the hood panel 10 is completely pushed up (a pedestrian receiving position RP of the hood panel 10) UP and is then locked by the lock mechanism R. In addition, the external thread portion 62a, which functions as a connecting portion which screws into the threaded hole 51d, is formed at a lower end of the shaft portion 62 of the support rod portion 60 in such a manner as to be connected to the piston portion 51.

Figure 8:
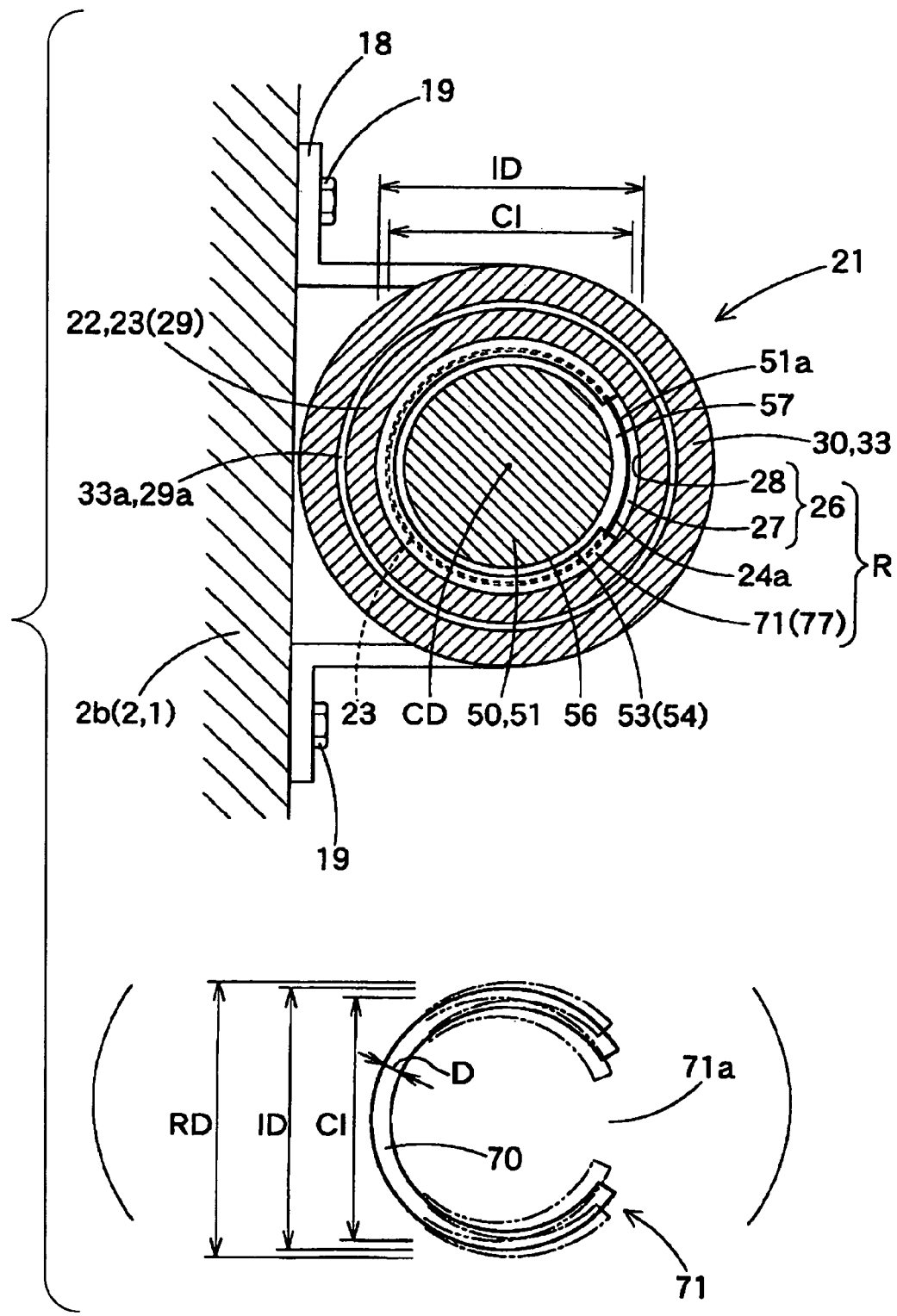
FIG. 8 is a partial enlarged horizontal sectional view of the actuator of the embodiment, which corresponds to a portion indicated by the line VIII-VIII in FIG. 6B.

As is shown in FIG. 8, the lock ring 71, which makes up the lock mechanism R, is formed by bending the wire material 70, which has the circular cross section and which is made of the spring steel, into a ring shape, and the ring shape is partly broken so as to form a gap 71a between end faces of the broken ring shape, the gap 71a being made to be diametrically reduced. As is shown in FIGS. 6A to 7C, the lock ring 71 is accommodated within the angular groove portion 54 of the accommodating groove 53 in a contracted state. Further, a outside diametrical dimension RD of the lock ring 71 which is not diametrically contracted is set to be larger than an inside diametrical dimension ID of the outer circumferential restricting surface 28 of the locking stepped portion 26 so that the outer circumferential surface 72 can be brought into abutment with the outer circumferential restricting surface 28 when the lock ring 71 gets out of the accommodating groove 53 to enter the locking stepped portion 26 (refer to FIG. 8).

In the case of the embodiment, the outside diametrical dimension RD of the lock ring 71 which is not diametrically contracted is 15 mm, the inside diametrical dimension ID of the outer circumferential restricting surface 28 of the locking stepped portion 26 is 14 mm, and an inside diametrical dimension C1 of the inner circumferential surface 24a of the main body portion 23 of the cylinder 22 is 13 mm. Because of this, in the event that the lock ring 71 is accommodated within the cylinder together with the piston rod 50 in such a state that the lock ring 71 is accommodated in the angular groove portion 54 of the accommodating groove 53 of the piston portion 51, including a case where the lock ring 71 slides over the inner circumferential surface 24a of the main body portion 23, the lock ring 71 is diametrically contracted down to the inside diametrical dimension CI of the inner circumferential surface 24a of the main body portion 23 of the cylinder 22. In addition, also in a case where the outer circumferential surface 72 is brought into abutment with the outer circumferential restricting surface 28 of the locking stepped portion 26, the lock ring 71 is diametrically contracted in the same manner. Thus, the lock ring 71 is held in the state in which the outer circumferential surface 72 is in press contact with the outer circumferential restricting surface 28 in an attempt to be restored to the diametrically expanded state.

In the lift-up apparatus U of the embodiment, when the activation circuit, not shown, detects or predicts a collision of the vehicle V with a pedestrian based on the electric signals from the sensors 6, the gas generator 43 in the actuator 21 is activated. In the event that the operating gas generated from the gas generator 43 is caused to flow into the interior of the cylinder 22, as is shown in FIGS. 5A, 5B, the internal pressure of the cylinder 22 is increased, and the piston portion 51 of the piston rod 50 which lies within the cylinder 22 receives the pressure and ascends together with the support rod portion 60 of the piston rod 50. Then, as is shown in FIGS. 3, 4, the support rod portion 60 push opens the door portion 8b of the actuator cover 8. Further, the head portion 61 is pushed against the receiving surface 16a of the receiving seat 16 to thereby raise the rear end 10c of the hood panel 10. Then, the piston portion 51 brings its ceiling surface 51c into abutment with the distal end wall portion 31 of the cylinder 22, and the piston rod 50 is disposed in its ascending completion position (its forward movement completion position) UP (refer to FIG. 5B). As the last action of the series of actions occurs, the lock mechanism R is activated, the descending (the backward movement) of the piston rod 50 is restricted and the piston rod 50 is locked. Then, the hood panel 10 receives the load F (refer to FIG. 4) the pedestrian who moves obliquely rearwards and downwards on the hood panel 10 from thereabove and is plastically deformed. In addition, the support rod portion 60, which is in abutment with the receiving seat 16a of the hood panel 10 at the head portion 61 at the upper end 50a, is bent and plastically deformed in such a manner that part of the head portion 61 which lies above the fixing point 63 is bent to the rear as indicated by chain double-dashed lines in FIG. 4 as the lower surface (the receiving surface) 16a of the rear end 10c of the hood panel 10 descends when the hood panel 10 receives the pedestrian. Because of this, the kinetic energy of the pedestrian is absorbed largely by the plastic deformation of the hood panel 10 and the plastic deformation of the support rod portion 60 and the pedestrian is received by the hood panel 10 in a preferred manner.

In addition, in the lock mechanism R of the actuator 21 of the embodiment, as is shown in FIGS. 5A to 6A and 6B, in the event that the piston rod 50 ascends until the piston portion 51 is brought into abutment with the distal end wall portion 31 of the cylinder 22 and the accommodating groove 53 of the piston portion 51 is disposed in the position where the locking stepped portion 26 of the cylinder 22 resides, the lock ring 71 accommodated in the accommodating groove 53 enters the locking stepped portion 26 as is shown in FIGS. 7A, 7B. Then, the lock ring 71 is allowed to diametrically expand on the locking and restricting surface 27 of the locking stepped portion 26 in such a state that the outer circumferential surface 72 is brought into abutment with the outer circumferential restricting surface 28 of the locking stepped portion 26 and that the inner circumferential side portion 74 projects further towards the axis center CO side of the main body portion 23 than the inner circumferential surface 24a of the main body portion 23 of the cylinder 22. Because of this, as is shown in FIGS. 7B, 7C, 5B, and 6C, even though the piston rod 50 attempts to descend after it has ascended, the taper restricting surface 58 having the taper shape which expands radially outwards while extending upwards comes into abutment with the inner face 75 on the upper surface side (the forward moving side) of the inner circumferential side portion 74 of the lock ring 71 which is projecting further towards the axis center CO side of the main body portion 23 than the inner circumferential surface 24a of the main body portion 23 of the cylinder 22 on the side surface side of the accommodating groove 53, whereby the descending of the piston rod 50 is restricted by making use of the locking ring 71 which is being restricted in the locking stepped portion 26.

As this occurs, the lock ring 71 is diametrically expanded in such a way as to be restored from the state in which the lock ring 71 is diametrically contracted to be accommodated in the accommodating groove 53 on the piston portion 51 and comes into abutment with the locking and restricting surface 27 of the locking stepped portion 26 on its backward side surface 73 and with the outer circumferential restricting surface 28 of the locking stepped portion 26 on its outer circumferential surface 72 to thereby be fixed to the locking stepped portion 26 in such a way as to be restricted with respect to its backward (descending) movement and diametrically expanding movement, and the inner surface 75 of the lock ring 71 is projecting further towards the axis center CO side of the main body portion 23 on the inner circumferential surface 24a side of the main body portion 23 of the cylinder 22. In other words, in this state, the lock ring 71 is projecting towards the inner circumferential side of the main body portion 23 at the portion on the cylinder 22 where the locking stepped portion 26 is disposed so as to constitute a locking edge 77 for locking the taper restricting surface 58 of the accommodating groove 53 on the piston portion 23 of the cylinder 22. In addition, since the wire material 70 forming the lock ring 71 has the circular cross section and even though the portion of the wire material 70 in the locking state is twisted in such a manner as to rotate about the vicinity of the center WO of the circular cross section, the lock ring 71 is not changed in such a manner as to reduce the projecting amount towards the inner circumferential side of the main body portion 23, the locking edge 77 made up of the lock ring 71 allows the taper restricting surface 58 of the accommodating groove 53 to come into abutment therewith in a stable manner so as to lock the piston portion 51 of the piston rod 50, thereby making it possible to implement locking so as to restrict the descending of the piston rod 50 even though the accommodating groove 53 ascends (moves forwards) together with the piston portion 51 to interfere with the locking edge 77 again.

Figure 9:
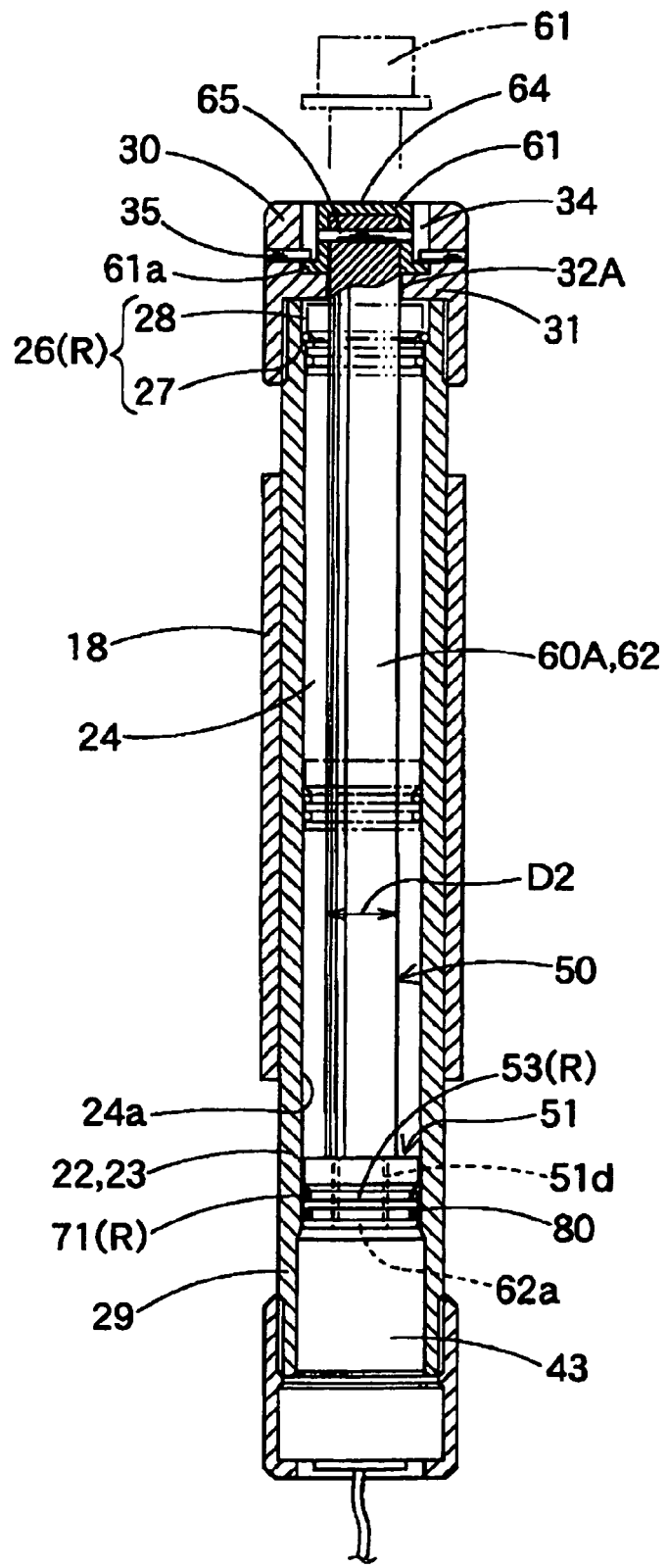
FIG. 9 is a schematic vertical sectional view showing a state in which the bending rigidity of a support rod portion in the actuator of the embodiment is changed.

In addition, in the actuator 21 of the embodiment, as is shown in FIGS. 5A, 5B and 9, the external thread portion 62a of the support rod portion 60 is removed from the threaded hole 51d and the different external thread portion 62a is screwed into the threaded hole 51d so as to replace the support rod portion 60 by the support rod portion 60A so that the bending rigidity of the support portion is changed in order to adjust the absorption amount of the kinetic energy of the pedestrian when the bending plastic deformation takes place. As this occurs, in the actuator 21, although the inside diametrical dimension of an insertion hole 32A for the support rod portion 60A in the distal end wall portion 31 on the cylinder side 22 needs to be adjusted, the configurations of the piston portion 51 including the accommodating groove 53, the lock ring 71 and the locking stepped portion 26 on the cylinder side 22 can continue to be used without any modification, the change in bending rigidity of the support rod portion being thereby dealt with easily.

Consequently, with the actuator 21 according to the invention, the descending of the piston rod 50 after it has operated or ascended can be restricted in a stable manner, and the attempt to change the bending rigidity of the piston rod 50 which supports the hood panel 10 can easily be dealt with.

In addition, in the actuator 21 according to the invention, the lock ring 71 is made of the wire material 70 having the circular cross section. Thus, even though the lock ring 71 accommodated in the accommodating groove 53 slides over the inner circumferential surface 24a of the main body portion 23 of the cylinder 22 when the actuator is activated, only the wire-like thin portion extending in the outer circumferential surface 72 of the lock ring 71 in the circumferential direction is brought into line contact with the inner circumferential surface 24a of the main body portion 23, whereby the piston rod 50 can ascend within the cylinder 22 in a smooth manner with suppressed frictional resistance.

In addition, in this embodiment, while the support rod portion 60 is made to be changed easily by making use of the thread constructions when adjusting the bending rigidity of the support rod portion 60 of the piston rod 50, the piston portion 51 and the support rod portion 60 may be configured into an integral unit. As this occurs, too, although at least the inside diametrical dimension of the insertion hole 32 for the support rod portion 60 in the distal end wall portion 31 on the cylinder 22 side needs to be adjusted, the configurations of the piston portion 51 including the accommodating groove 53, the lock ring 71 and the locking stepped portion 26 on the cylinder side 22 do not have to be changed but can continue to be used, the attempt to change the bending rigidity of the support rod portion or the piston rod being thereby dealt with easily.

In addition, in the case of the embodiment, the width dimension of the locking and restricting surface 27 of the locking stepped portion 26 which extends from the inner circumferential surface 24a of the main body portion 23 to the outer circumferential restricting surface 28 along the direction at right angles to the axis of the main body portion 23 is equal to or larger than the radius dimension r of the wire material 70 of the lock ring 71. Additionally, in the case of the embodiment, the width dimension CB of the locking and restricting surface 27 is equal to the radius dimension r of the wire material 70.

Because of this, in the event that when the piston rod 50 ascends as the actuator is activated to operate, the lock ring 71 then expands diametrically to thereby enter the locking stepped portion 26 from the accommodating groove 53, the outer circumferential surface 72 of the lock ring 71 is then brought into abutment with the outer circumferential restricting surface 28 of the locking stepped portion 26, and eventually, the backward side surface 73 of the lock ring 71 is brought into abutment with the locking and restricting surface 27 of the locking stepped portion 26, the portion of the backward side surface 73 of the lock ring 71 which is brought into abutment with the locking and restricting surface 27 of the locking stepped portion 26 can, as is shown in FIG. 7C, ensure the state in which a backward moving side apex portion 73a is brought into abutment with the area of the locking and restricting surface 27 itself which lies in the vicinity of an edge 27a of the main body portion 23 which lies on the inner circumferential surface 24a side thereof. Namely, the apex portion 73a on the descending side of the wire material 70 with the circular cross section which makes up the lock ring 71 is brought into abutment with the locking and restricting surface 27 which confronts the descending direction at right angles to thereby restrict the descending of the lock ring 71. Therefore, even though the compression stress applied to the piston rod 50 is high, the locking and restricting surface 27 of the locking stepped portion 26 can receive the piston rod 50 with the lock ring 71 interposed therebetween. Further, in the event that the diametrically expanded lock ring 71 is brought into abutment with the outer circumferential restricting surface 28 of the locking stepped portion 26 on the outer circumferential surface 72 thereof, the center WO of the cross section of the wire material 70 which makes up the lock ring 71 comes to be disposed in the area of the locking and restricting surface 27 from the inner circumferential surface 24a of the main body portion 23 along the direction which is at right angles to the axis of the main body portion 23. Due to this, even though the lock ring 71 interferes with the taper restricting surface 58 and attempts to return to the accommodating position in the accommodating groove 53 side (the initial accommodating position before the activation of the actuator 21 or the piston rod 50), on the lower side (the backward moving side) to which the lock ring 71 attempts to move, the locking and restricting surface 27 lies squared against the lock ring 71 with the backward moving side apex portion 73 of the wire material 70 having the circular cross section and making up the lock ring 71 kept stationary to restrict the descending movement of the lock ring 71. Therefore, the behavior of the lock ring 71 attempting to be restored to the accommodating position in the accommodating groove 53 is prevented in an ensured manner, thereby making it possible to ensure the stable locking state.

In addition, in the case of the embodiment, the width dimension CB of the locking and restricting surface 27 is the radius dimension r of the circular cross section of the wire material 70 of the lock ring 71, so as to increase the projecting amount by which the portion 74 on the inner circumferential side of the lock ring 71 projects towards the inner circumferential surface 24a side of the main body portion 23 of the cylinder 22 is increased as much as possible, and this also ensures in a stable manner the locking of the inner surface 75 of the lock ring 71 by the taper restricting surface 58.

In addition, in the actuator 21 of the embodiment, while the forward movement is described as the ascending movement and the backward movement as the descending movement, the operating directions are not limited thereto. For example, the actuator of the invention may be applied to an application where it operates in a horizontal direction, and the automotive safety equipment in which the actuator of the invention is used may be applied to safety equipment other than the lift-up apparatus U for raising the hood panel 10. For example, the invention may be applied to an actuator for use in a knee protection system as automotive safety equipment in which the knees of an occupant of a vehicle such as a driver or front seat passenger are received by a knee panel.

Further, in the actuator 21 of the embodiment, while the case is illustrated in which the gas generator 43 for generating gas by igniting the gas generating chemicals when the activation signal is inputted thereinto is disposed in the interior of the cylinder 22, as the drive source for moving the piston rod 50, water, oil and air may be used as an operating fluid, so that the piston rod 50 is raised by making use of their water pressure, oil pressure and air pressure.

Furthermore, as the drive source for moving the piston rod forwards, the suction force of a solenoid and the biasing force (restoring force) of a compressed spring can be used. For example, in the case of the suction force of a solenoid being used, a movable iron core is disposed within the cylinder as a piston rod. When exciting coils disposed around the circumference of the movable iron core in the cylinder are energized, the piston can be caused to move forwards. In addition, in the case of a spring being used, the piston rod is connected to a free end side of a compressed coil spring, and a distal end of the piston rod or the compression coil spring is locked by a stopper which is made up of a solenoid in such a manner as to be pulled in. Then, in the event that the stopper so configured is made to be pulled in so as to cancel the locking, the piston rod moves forwards by the restoring force of the compression coil spring.

What is claimed is:

1. An actuator for use in automotive safety equipment configured such that when activated to operate, a piston rod having a piston portion within a cylinder and a support rod portion connected to the piston portion and projecting out of the cylinder is caused to move forwards and comprising a lock mechanism for restricting a backward movement of the piston rod that has moved forwards, the support rod portion projecting from the cylinder being made to support a receiving member for receiving an object to be protected, wherein the support rod portion is disposed so as to be bent and plastically deformed when the receiving member receives the object to be protected after the support rod portion has moved forwards so as to absorb kinetic energy of the object to be protected, wherein the cylinder comprises:

a main body portion along which the piston portion which is moving forwards is allowed to slide; and a distal end wall portion disposed on a distal end side which constitutes the receiving member side, allowing the support rod portion to pass therethrough and having an insertion hole which prohibits the insertion of the piston portion, wherein the lock mechanism comprises:

an annular lock ring contracted diametrically to be accommodated in an accommodating groove formed on an outer circumferential surface of the piston portion along a circumferential direction while being made to diametrically expand when being restored and made of an elastically deformable wire material having a circular cross section; and a locking stepped portion disposed in the vicinity of the distal end wall portion of the main body portion of the cylinder and in the vicinity of the lock ring positioned after the piston rod has moved forwards and recessed diametrically beyond an inner circumferential surface of the main body portion so as to restrict a backward movement of the lock ring, wherein the locking stepped portion comprises:

a locking and restricting surface brought into abutment with a backward moving side portion of the lock ring as a surface which is at right angles to an axial direction of the main body portion when restricting a backward movement of the lock ring; and an outer circumferential restricting surface extending from an outer circumferential edge of the locking and restricting surface to a forward moving side of the piston rod along the axial direction of the main body portion so as to be brought into abutment with an outer circumferential surface of the locking ring which is being diametrically expanded when restricting a backward movement of the lock ring, wherein the locking and restricting surface is disposed in such a manner that a width dimension which extends from the inner circumferential surface of the main body portion to the outer circumferential restricting surface along a direction which is at right angles to an axis of the main body portion is referred to as a dimension by which an inner circumferential side portion of the lock ring is caused to project further towards an axial center of the main body portion than the inner circumferential surface of the main body portion in such a state that the lock ring is expanded diametrically so as to be brought into abutment with the outer circumferential restricting surface, wherein the accommodating groove on the piston portion is formed into a recessed shape which enables the forward movement of the piston rod in such a state that the lock ring is accommodated in the accommodating groove and has a taper restricting surface formed on a side of the piston rod which faces the forward moving side, the taper restricting surface having a taper shape which is expanded radially outwards, and wherein the taper restricting surface is brought into abutment with a forward moving side inner surface of the inner circumferential side portion of the lock ring and the lock ring is diametrically expanded to be in abutment with the locking and restricting surface and the outer circumferential restricting surface of the locking stepped portion after the piston rod has moved forwards, so as to enable the restriction of a backward movement of the piston rod by making use of the lock ring which is restricted by the locking stepped portion.

2. An actuator as set forth in claim 1, wherein the locking and restricting surface of the locking stepped portion is disposed in such a manner that a width dimension which extends from the inner circumferential surface of the main body portion to the outer circumferential restricting surface along a direction which is at right angles to an axis of the main body portion is made to be equal to or larger than a radius dimension of the wire material which forms the lock ring.

* * * * *